Patented Jan. 16, 1951

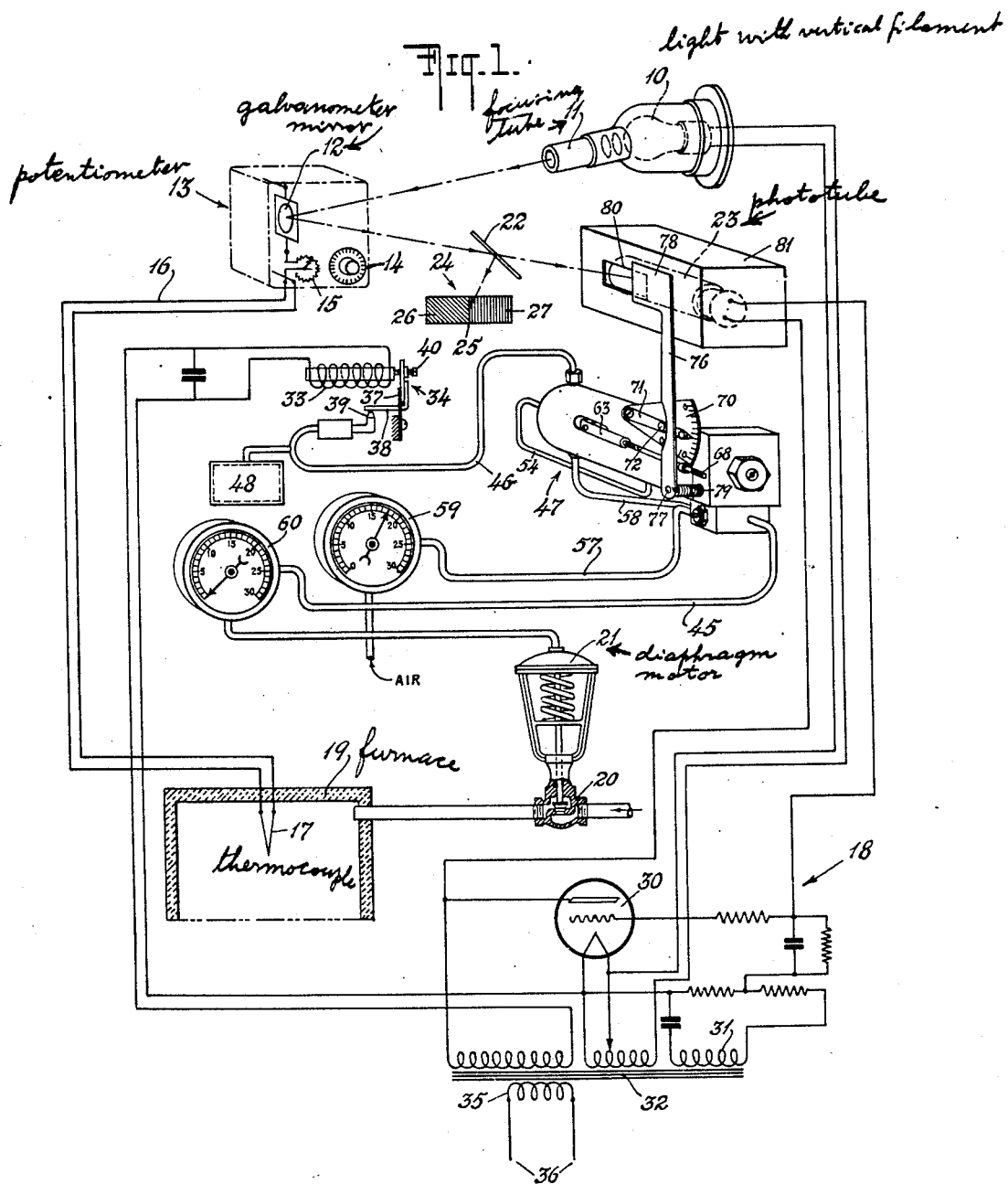

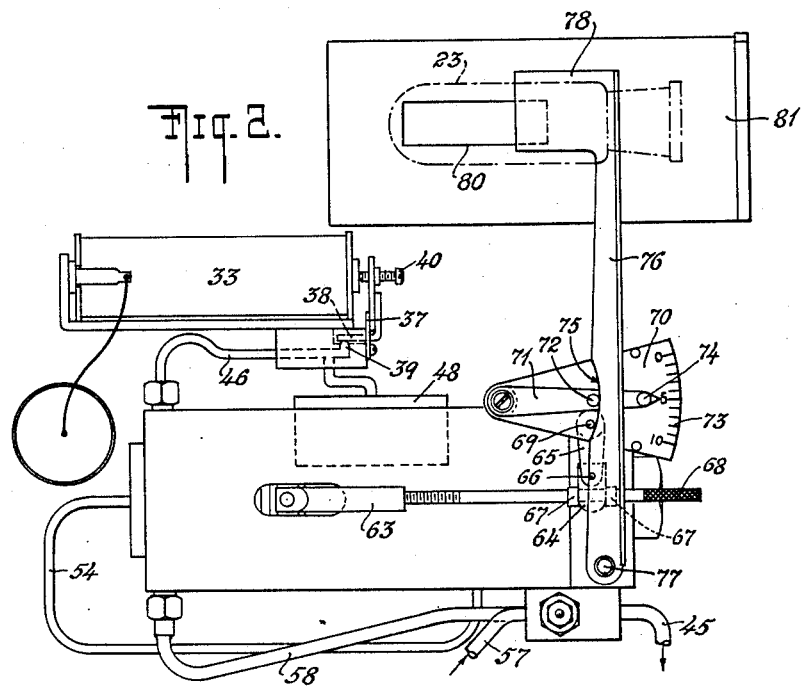
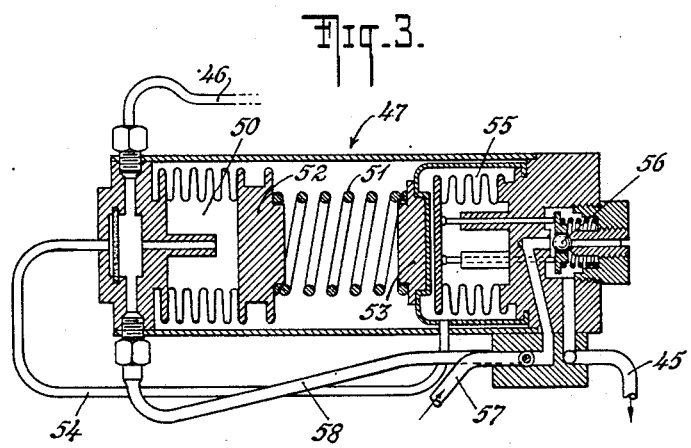

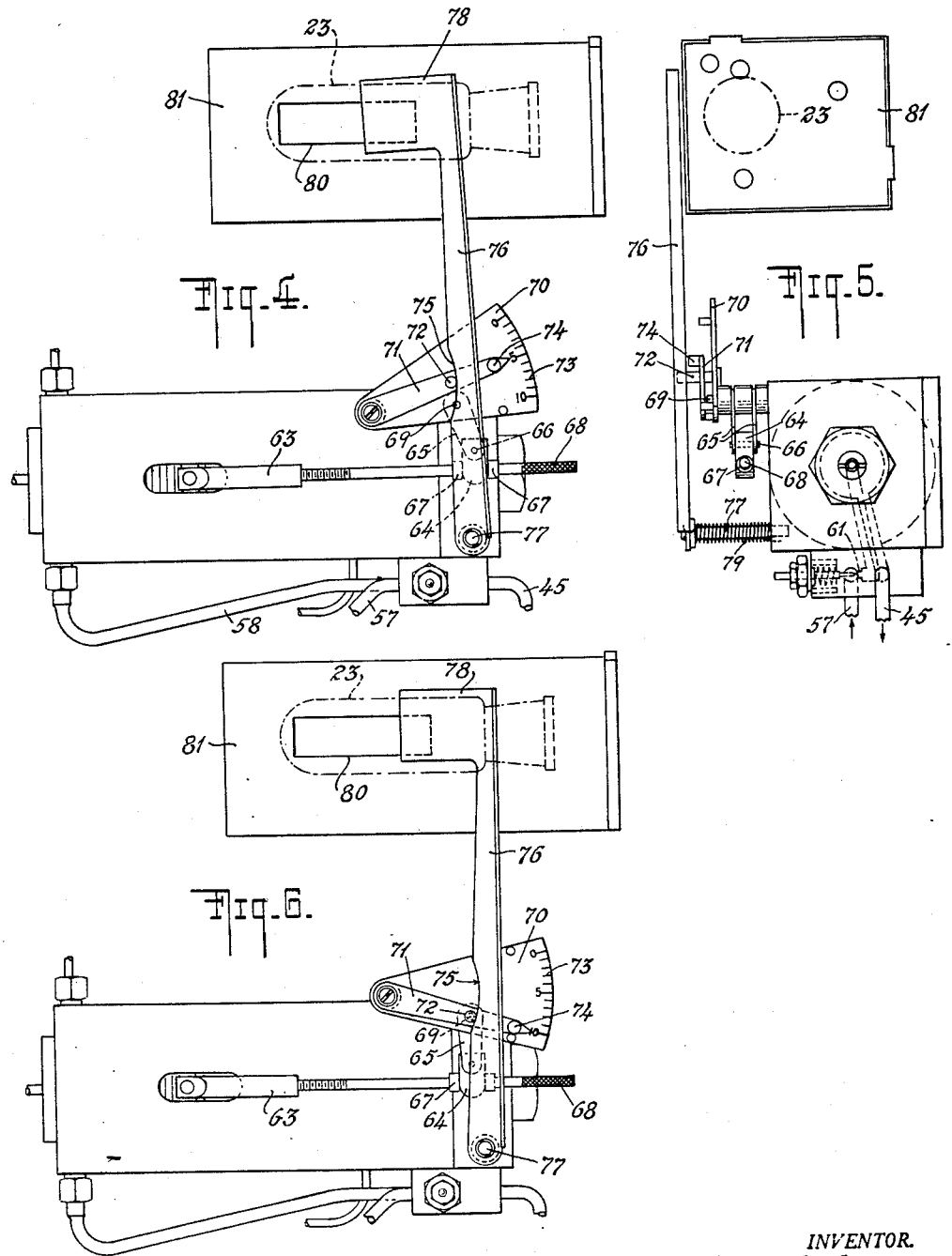

2,538,618

UNITED STATES PATENT OFFICE 2,538,618

PRESSURE FLUID SERVOMOTOR WITH LIGHT RESPONSIVE FOLLOW-UP MEANS

Charles O. Fairchild, St. Albans, N. Y., assignor, by mesne assignments, to Weston Electrical Instrument Corporation, Newark, N. J., a corporation of New Jersey Application February 25, 1944, Serial No. 523,831

7 Claims. (Cl. 121—41)

The present invention relates to an improved instrument for controlling and measuring a physical variable.

In the past, the recording and controlling of physical variables, such as, fluid pressure, temperature, etc. have been accomplished either by the use of electrically-operated devices or air-operated devices and while each of these types of devices give satisfactory results for certain conditions of operation, it possesses certain inherent disadvantages which render it not entirely satisfactory or even unsuitable for other conditions of operation.

The principal object of the present invention is to provide a controlling and measuring instrument having the combined advantages of prior electrically-operated and air-operated devices without their inherent disadvantages.

Another object of the invention is to provide an instrument having the combined advantages of high sensitivity and ease of assembly obtained by the use of a galvanometer which is readily connectable by wires to a sensitive element, such as, a thermocouple or a resistance thermometer, and power such as is attained by the various modes of air-operated automatic controls developed by the art.

Another object of the invention is to provide an instrument in which the mirror for the galvanometer and the photoelectric means is combined with an air-operated follow-up device which is movable in the third stage of amplification of forces, thus eliminating the errors from friction found in the follow-up of pressure-spring instruments.

A further object of the invention is to provide an instrument having a simple and improved adjustment for the sensitivity of the follow-up.

A still further object of the invention is to provide an instrument of the type indicated, having a true manual reset as this is understood in the art.

A still further object of the invention is to provide an instrument of the indicated type having a compact and serviceable design and of such simplicity of construction as will render it readily understandable and serviceable under industrial conditions of use.

Other objects of the invention as well as the advantages thereof will become apparent to those skilled in the art after a perusal of the following description when read in connection with the accompanying drawings in which Fig. 1 is a diagrammatic view, partially in perspective, of a preferred embodiment of the invention, the invention being here shown regulating the temperature of a furnace; Fig. 2 is a detailed elevational view, on an enlarged scale, of the mechanism connecting the screen for the phototube with the air-operated follow-up motor; Fig. 3 is a longitudinal vertical section of the air motor shown in Fig. 2; Fig. 4 is a view similar to Fig. 2 but illustrating the relation of the parts when the phototube screen is advanced from the position shown in Fig. 2; Fig. 5 is a side elevational view of the mechanism shown in Fig. 4 and Fig. 6 is a view similar to Fig. 4 showing the relation of the parts when set for highest sensitivity.

Referring more particularly to Fig. 1 of the drawings, the reference numeral 10 indicates a lamp which is preferably provided with a vertical filament and sends a beam of light through a focusing tube 11 to a galvanometer mirror 12 of potentiometer 13. The potentiometer 13 is provided with a knob 14 for manually setting a chosen temperature and a rheostat 15 which is connected in series, in the circuit 16, with the galvanometer coil and a thermocouple 17 and which is manually adjustable to vary the sensitivity of galvanometer 12. The coil or movable element of the galvanometer is shown by the rectangle enclosing the mirror 12. Potentiometer 13 may be connected with a standard current provided by one or more dry cells when lamp 10 and the photoelectric means 18 are mounted within its case. Thermocouple 17 is located in a furnace 19 whose means for supplying heat input is throttled by inlet valve 20. A diaphragm motor 21 controls spring-opposed inlet valve 20 which is of the "reverse-acting" type, i. e. one in which an increase of pressure to the diaphragm motor 21 causes an opening of the valve.

The light beam from the galvanometer mirror 12 passes through a partial reflector 22 to a phototube 23. The reflector 22 is a transparent plate, such as, a piece of plate glass having parallel plane surfaces and is positioned in the path of the beam reflected by the galvanometer mirror 12 in order to direct a portion of the swinging light beam upon a window 24 provided on the front of the potentiometer 13, the larger part of the light however, being transmitted to the photocell. The window 24 is provided with a centrally disposed index line 25 and to the right and left of such line, different colored zones 26 and 27. When the instrument is in balance, that is, when the predetermined value of the variable is being maintained, a double image of the light beam (double reflection from the surfaces of plate 22) will be thrown on index line 25 which then becomes illuminated and makes known to an attendant, who may be at a distance from the instrument, that the instrument is functioning properly. On the other hand, if the streak of light is in either of the colored zones 26 and 27, the instrument is out of balance and has not yet restored the predetermined value of the variable. The zone 27 may be colored red to indicate, for example that the temperature has increased, and the zone 26 may be colored blue or green to indicate that the temperature has fallen. Any other combination of colors may be employed to reveal at a glance, and from a distance, the condition of the controlled variable or of the instrument.

The light reaching phototube 23 will be converted into a proportional output by the amplifier tube 30 of the photo-electric means 18 which also includes secondaries 31 of transformer 32 and electromagnet 33 of relay 34, the primary 35 of transformer 32 being connected with A. C. supply lines 36. Although the photo-electric means 18 shown is preferably used, it will be understood that the invention is not limited to this particular circuit which has been used purely for purposes of illustration as many other appropriate circuits are suitable for use with the present invention for operating relay 34.

The relay 34 comprises a flat plate armature which is mounted on the free end of a flat, snapless, spring pivot 37 secured to a fixed portion of the casing and which has affixed thereto a plate or tongue 38 which acts as a throttling closure or hinged valve member for a nozzle 39. The armature of relay 34 is also provided with an adjustable stop 40 which is so set that the tongue closes the nozzle 39 while the armature is still far enough away from the iron pole-face of the electromagnet 33 that the non-linearity of magnetic pull is not too great. The relay 34 through tongue 38 controls the air pressure in line 45 to the spring-opposed diaphragm motor 21 of the air-operated control valve 20 through line 46 and the air-operated device 47. Since the air-operated follow-up device, as shown, may have a tendency to itself oscillate, a surge tank 48 is provided to smooth out the changes in pressure in line 46 resulting from the changes in position of tongue 38 relative to nozzle 39. The size of such surge tank and the associated resistance to air flows being so selected as to compensate for any damping or lag in the photo-electric means 18, which damping or lag will depend primarily upon the time constant of the grid circuit in amplifier 30, as described in detail in my Patent No. 2,264,256 issued November 25, 1941.

The air-operated device 47 may be any one of the various types of such devices well known in the art, as developed in air-operated regulators. In the device illustrated, (note Figs. 1 to 3) there is provided a bellows 50 which is connected by line 46 with nozzle 39 and which is opposed by a spring 51 intermediate the movable end wall 52 of such bellows 50 and a fixed plate 53. The interior of bellows 50, line 46 and nozzle 39 are connected by a tube 54 with an aligned bellows 55. Thus as the air pressure in bellows 50 increases or decreases, the air pressure on the outside of bellows 55 will also increase or decrease, respectively, to position an air valve ball 56 so as to increase or decrease, respectively, the air pressure in the diaphragm motor 21 of valve 20 and consequently opening or closing, respectively, the valve 20 which is of the reverse acting type, as has been previously mentioned. The air for this mechanism is supplied by line 57 which is connected through restrictive opening 61 to line 46 and bellows 50 and 55 by line 58 and which is connected to diaphragm motor 21 through an air valve 56 and line 45. Air supply line 57 is provided with a gauge 59 to indicate to an attendant the pressure in such line and line 45 to the diaphragm motor 21 is provided with a gauge 60 to indicate the air pressure in such motor. Preferably the air supplied is maintained at 25 pounds or more in the main line and is reduced to 18 pounds by an individual air-reducing valve at the instrument (not shown).

A follow-up is provided to reduce the sensitivity of the instrument, that is, to broaden its throttling zone. As is shown more clearly in Figs. 2 and 4 to 6 of the drawings, the follow-up mechanism includes an adjustable rod 63 which is connected at one end to the movable end wall 52 of the bellows 50 and is supported adjacent its other end by a block 64 carried by a pair of links 65 which are pivotally connected to the block by a pin 66. The position of the block 64 relative to the rod 63 is fixed by a pair of spaced block portions 67 provided on the rod 63. The outer end of the rod 63 is provided with a knurled finger piece 68 whereby minute adjustments in the length of the rod 63 may be made. The links 65 are adjustably secured to a stud shaft 69 provided on the casing of the air-operated device and having adjustably secured to its outer end a triangularly-shaped plate 70. It will thus be understood that the linear movement of the end wall 52 of bellows 50 will be translated into angular movement of plate 70 about the stud shaft 69 as a pivot, through rod 63, block 64 and links 65. The angular movement of plate 70 for any movement of the end wall 52 of bellows 50 will thus be substantially proportional over the small range used to the change of pressure in bellows 50 causing such movement.

Carried by the plate 70 is an arm or lever 71, which is pivotally connected to the apex end of such plate and which is provided with a pin or cam member 72 positioned thereon so that in one position of the lever 71, i. e. when the lever is set at 10 with respect to the scale 73 provided on the arcuately shaped edge of plate 70, such pin 72 will be in alignment with the axis of rotation of the plate 70. Movement of the lever 71 with respect to the scale 73 is accomplished by manually grasping the finger piece 74 provided on the outer end of such lever and then shifting the lever about its pivot. Once set, arm or lever 71 remains in position until manually moved therefrom. The pin 72 coacts with an arcuately-shaped edge portion or cam surface 75 provided along one edge of a staff 76 which is pivotally mounted at its lower end on a stud-shaft or rod 77 provided on the casing of the air-operated device and which is provided at its upper end with a flag or screen 78. A coiled spring 79 maintains the arcuate edge 75 of staff 76 in engagement with pin 73. The flag or screen 78 is arranged to move in front of the phototube 23 and across a slot 80 provided on the housing or fixed screen 81 in which the phototube 23 is mounted. With this construction, it will be seen that when the lever 71 is at ten with respect to the scale 73 so that the pin 72 is in alignment with the axis of rotation of the plate 70, rotational movement of the latter will only cause rotational movement of the pin 72 about the same axis and consequently the staff 76 and flag 78 will remain in a fixed, predetermined, normal position throughout the rotational movement of plate 70, this position corresponding to the position of the flag when the control temperature is normal. This position of pin 72 therefore may be termed the zero sensitivity of the follow-up mechanism or shield 78 (maximum sensitivity of the instrument as a regulator for which the scale 73 has been indicatively marked) as with this adjustment, the throttling range is zero, the flag 78 standing still as the control pressure varies and the controller acting as an on-and-off or open-and-shut controller, opening or closing the valve 20 to its limits for small changes in temperature, for example. As the temperature varies, the light image moves across the controlling edge of flag 78 and more or less of the light reaches the phototube 23. More light on phototube 23 causes more current to flow through the electromagnet 33 thus drawing in the armature of relay 34 and moving tongue 38 closer to nozzle 39 and raising the controlled air pressure. Less light on the phototube 23 lowers the controlled air pressure by decreasing the current to electromagnet 33. When the lever 71, however, is adjusted with respect to scale 73 so that pin 72 is swung through an arc whose chord is proportional to the desired sensitivity, movement of plate 70 about its pivot will also cause an amount of movement of pin 72 about the axis of such plate corresponding to its adjustment from such axis and such movement wil cause a corresponding movement of staff 76 and flag 78 to be effected in the same direction under the influence of spring 79. The mechanism is so arranged that these movements of pin 72 and flag 78 will follow the light beam as it moves back and forth with changes in temperature. Thus if the lever 71 is set for a sensitivity of 5 on scale 73, as shown in Fig. 2 of the drawings, and the temperature varies to cause the light beam to move to the left, as viewed in this figure, to throw more light on the phototube 23 and thereby raise the pressure in bellows 50, plate 70 would be rotated a corresponding amount to the left (see Fig. 4) to permit flag 78 to follow the light beam a corresponding amount. In following the light beam, the flag 78 is always intercepting part of the light and permitting the other part to reach the phototube. If the light beam in the operation of the instrument regularly moves beyond the limits of the throttling zone as determined by the position of lever 71, it is advisable to widen the throttling zone by shifting lever 71 to a lower setting on the scale 73.

While it is believed that the operation of the above described instrument has been described in some detail, the following more general description may give a clearer picture of the operation of the entire regulating system. Assuming that the lever or arm 71 is set at a position other than ten so that there is established a predetermined throttling zone, as long as the temperature of thermocouple 17 in the furnace 19 is steady at the temperature for which the potentiometer was set, the light beam reflected from the galvanometer mirror 12 has substantially steady images at corresponding positions relative to the median line 25 of window 24. When the temperature of thermocouple 17 rises or falls the mirror 12 will be actuated to swing the light image to the right or left, respectively, as viewed in the drawings across the controlling edge of the flag 78 so that less or more light, respectively, will reach the phototube 23. This causes a proportionate decrease or increase, respectively, in the current output of the photoelectric means 18, which change in current moves relay 34 to change the position of tongue 38 with respect to its nozzle 39 so that the pressure in line 46 and in bellows 50 is promptly lowered or raised, respectively, a corresponding amount. The change of pressure in line 46 and bellows 50 will cause a corresponding change on bellows 55 and as the air pressure on bellows 55 decreases or increases, it positions the air valve ball 56 to decrease or increase, respectively, the air pressure in the diaphragm motor 21 and closing or opening valve 20 as required. At the same time, the decrease or increase of air pressure in bellows 50, causes rod 63 to actuate plate 70 in a clockwise or counter-clockwise direction, respectively, to cause flag 78 to follow the light beam thus tending to permit more or less light to reach the phototube 23.

It will be noted, that in the aforedescribed instrument, for every position of the light beam, there is a corresponding pressure of the controlled air for any selected value of the manual reset. It follows, of course, that there is a corresponding position of the diaphragm valve 20 as in all throttling controllers. It will be noted also, that the manual reset can be taken care of in any number of ways, for example, by moving the phototube 23, by adjustment of the reset arm 63 of the motor, by moving the pivot for the flag 78 or by moving the pivot for the plate 70.

While I have shown and described a preferred embodiment of my invention, it will be understood by those in the art that various changes and modifications may be made therein without departing from the spirit of the invention or the scope of the appended claims.

I claim:

1. In an instrument of the measuring and controlling class for positioning the control element in correspondence with its air pressure and an air relay means for governing the air pressure in such air motor, the combination of means sensitive to a variable including a member whose position depends upon the value of said variable, means for modifying a light beam in accordance with the position of said member, an electric network including a photosensitive means in the path of the light beam to proportion the electrical condition of the network to the value of the variable and an element movable to a position corresponding with such condition, fluid pressure control means including a fluid control nozzle and a valve element cooperating with said nozzle and controlled by said movable element to vary its position in correspondence with such condition and thereby to vary the pressure in said nozzle in accordance with the condition of said network, a fluid motor connected to said nozzle and operable in accordance with such changes in pressure, a positionable member coacting with said photosensitive means and located to control the amount of light from such beam reaching said photosensitive means, means interposed between said fluid motor and said positionable member so as to cause the latter to tend to follow the positions of said member and upon such movement coacting with said photosensitive means to partially neutralize the electric condition created in said network by the change in value of the variable, said interposed means including a sensitivity selection device adjustable to vary the effect of said fluid motor on said positionable member.

2. In an instrument of the measuring and controlling class, the combination of means sensitive to a variable including a member whose position depends upon the value of said variable and means for modifying a light beam in accordance with the position of said member, an electric circuit including photoelectric means in the path of the beam of light for creating in the circuit an electrical condition corresponding to the value of the variable, a movable valve element controlled by the condition of such circuit so that its position corresponds with such condition, a fluid motor, a fluid pressure source connected with said fluid motor, a fluid nozzle connected with said source and said fluid motor and arranged in operative relation with said valve element so that the pressure in said fluid motor will vary in functional relation with the position of said member, and means connected to and controlled by said motor to be continuously positioned in the path of the light beam so as to maintain a functional relation between the pressure in said motor and the position of said member, said last mentioned means including a shield pivoted to be angularly movable to intercept more or less of the light beam reaching the photoelectric means, and a sensitivity selection device comprising an oscillatable member which is pivoted about an axis to move it parallel to that of said shield, a link connecting said fluid motor with said oscillatable member to move the latter in accordance with the pressure in said motor, a lever pivoted on said oscillatable member and having a pin cooperating with said shield, said lever being arranged to alter the relative movements of said shield and motor and to permit such alteration without altering the position of said shield when the latter is in a predetermined position.

3. In an instrument of the measuring and controlling class, the combination of means sensitive to a variable including a member whose position depends upon the value of said variable and means for modifying a light beam in accordance with the position of said member, an electric circuit including photoelectric means in the path of the beam of light for creating in the circuit an electrical condition corresponding to the value of the variable, a movable valve element controlled by the condition of such circuit so that its position corresponds with such condition, a fluid motor, a fluid pressure source connected with said fluid motor, a fluid nozzle connected with said source and said fluid motor and arranged in operative relation with said valve element so that the pressure in said fluid motor will vary in functional relation with the position of said member, and means connected to and controlled by said motor to be continuously positioned in the path of the light beam so as to maintain a functional relation between the pressure in said motor and the position of said member, said last mentioned means including a shield pivoted to be angularly movable to intercept more or less of the light beam reaching the photoelectric means, a sensitivity selection means connecting said shield to said motor and operable to alter the relative movements of said motor and shield and manually operable means for altering the relation between the pressure in said motor and the position of the shield.

4. In an instrument of the measuring and controlling class for positioning the control element in correspondence with its air pressure and an air relay means for governing the air pressure in such air motor, the combination of means sensitive to a variable including a member whose position depends upon the value of such variable, means for modifying a light beam in accordance with the position of said member, an electric network including photoelectric means in the path of the light beam for creating in the network an electrical condition corresponding to the value of the variable, fluid pressure control means including a fluid control nozzle and a movable valve element cooperating with said nozzle and controlled by the condition of said network to vary its position in correspondence with such condition and thereby to vary the pressure in said nozzle in accordance with the condition of said network, a fluid motor connected to said nozzle and operable in accordance with such changes in pressure, means intermediate the nozzle and the motor for damping variation of the nozzle air condition to control the relation of the valve element and the fluid motor to that of the measured variable, follow-up means interposed between said motor and said photoelectric means, said follow-up means being operated by said motor to further modify said light beam so as to partially neutralize the electrical condition created in said network by the change in position of said member.

5. In an instrument of the measuring and controlling class, the combination of means sensitive to a variable including a member whose position depends upon the value of said variable, means for modifying a light beam in accordance with the position of said member, an electric network including photoelectric means in the path of the light beam for creating in the network an electrical condition corresponding to the value of the variable and an amplifier for amplifying the output of said photoelectric means, fluid pressure control means including a fluid control nozzle and a movable valve element cooperating with said nozzle and controlled by the condition of said network to vary its position in correspondence with such condition and thereby to vary the pressure in said nozzle in accordance with the condition of said network, a fluid motor connected to said nozzle and operable in accordance with such changes in pressure, a positionable member coacting with said photoelectric means and located to control the amount of light from such beam reaching such photoelectric means, follow-up means interposed between said motor and said positionable member, said follow-up means being operated by said motor and tending to adjust said positionable member to further modify said light beam so as to partially neutralize the electrical condition created in said network by the change in position of said member, a damping or delaying means contained in the grid-phototube circuit and having a time constant materially differing from the natural period of oscillation of said positionable means.

6. In an instrument of the measuring and controlling class, the combination of means sensitive to a variable including a member whose position depends upon the value of said variable and means for modifying a light beam in accordance with the position of said member, an electric circuit including photoelectric means in the path of the beam of light for creating in the circuit an electrical condition corresponding to the value of the variable, a movable valve element controlled by the condition of such circuit so that its position corresponds with such condition, a fluid motor, a fluid pressure source connected with said fluid motor, a fluid nozzle connected with said source and said fluid motor and arranged in operative relation with said valve element so that the pressure in said fluid motor will vary in functional relation with the position of said member, and means connected to and controlled by said motor to be continuously positioned in the path of the light beam so as to maintain a functional relation between the pressure in said motor and the position of said member, said last mentioned means including a shield pivoted to be angularly movable to intercept more or less of the light beam reaching the photoelectric means, an adjustable link connected to said fluid motor, a sensitivity selection device intermediate said shield and said adjustable link and a manual reset connected to said adjustable link to vary the length of the latter to alter the relation between the pressure in said motor and the position of said shield.

7. In an instrument of the measuring and controlling class, the combination of means sensitive to a variable including a member whose position depends upon the value of said variable and means for modifying a light beam in accordance with the position of said member, an electric circuit including a photoelectric means in the path of the beam of light for creating in the circuit an electrical condition corresponding to the value of the variable, a movable valve element controlled by the condition of such circuit so that its position corresponds with such condition, a fluid motor, a fluid pressure source connected with said fluid motor, a fluid nozzle connected with said source and said fluid motor and arranged in operative relation with said valve element so that the pressure in said fluid motor will vary in functional relation with the position of said member, means connected to and controlled by said motor for maintaining a functional relation between the pressure in said motor and the position of said member, said last mentioned means including means movable by said motor to be continuously positioned in the path of the light beam for further modifying the light beam, a sensitivity selection device associated with said continuously positioned means for adjusting the relation between the rate of variation of the pressure in said fluid motor and the movement of said member without disturbing said continuously positioned means, and reset means for altering the relation between the pressure in said motor and the position of said continuously positioned means.

CHARLES O. FAIRCHILD.

REFERENCES CITED

The following references are of record in the file of this patent:

UNITED STATES PATENTS

| Number | Name | Date |
| --- | --- | --- |
| 1,818,103 | Sperry | Aug. 11, 1931 |
| 1,925,833 | French | Sept. 5, 1933 |
| 1,957,240 | Young | May 1, 1934 |
| 2,020,847 | Mitereff | Nov. 12, 1935 |
| 2,117,800 | Harrison | May 17, 1938 |
| 2,126,887 | Hodgman | Aug. 16, 1938 |
| 2,166,824 | Runaldue | July 18, 1939 |
| 2,191,792 | Hill | Feb. 27, 1940 |
| 2,210,916 | Kenyon | Aug. 13, 1940 |
| 2,243,456 | Dutter | May 27, 1941 |
| 2,283,927 | Howe | May 26, 1942 |
| 2,310,298 | Kuhl | Feb. 9, 1943 |
| 2,326,238 | Mabey | Aug. 10, 1943 |